United States Patent
Forestier et al.

(10) Patent No.: US 8,446,472 B2
(45) Date of Patent: May 21, 2013

(54) MIXED OPTICAL DEVICE FOR MULTIFOCAL IMAGING AND IR CALIBRATION

(75) Inventors: Bertrand Forestier, Paris (FR); Etienne Payot, Voisins-le Bretonneux (FR)

(73) Assignee: Thales, Neuilly sur Seine (FR)

( * ) Notice: Subject to any disclaimer, the term of this patent is extended or adjusted under 35 U.S.C. 154(b) by 473 days.

(21) Appl. No.: 12/920,725

(22) PCT Filed: Mar. 4, 2009

(86) PCT No.: PCT/EP2009/052525
§ 371 (c)(1),
(2), (4) Date: Sep. 2, 2010

(87) PCT Pub. No.: WO2009/112401
PCT Pub. Date: Sep. 17, 2009

(65) Prior Publication Data
US 2011/0007166 A1    Jan. 13, 2011

(30) Foreign Application Priority Data
Mar. 4, 2008   (FR) ..................... 08 01184

(51) Int. Cl.
*H04N 5/33*   (2006.01)

(52) U.S. Cl.
USPC ........... 348/164; 348/240; 348/342; 351/159; 351/214

(58) Field of Classification Search
USPC ........................ 348/160–342; 351/206–214
See application file for complete search history.

(56) References Cited

U.S. PATENT DOCUMENTS

| | | | |
|---|---|---|---|
| 6,181,486 B1 | 1/2001 | Forestier et al. | |
| 7,090,348 B2 * | 8/2006 | Nason et al. | 351/159.74 |
| 7,221,399 B2 * | 5/2007 | Fujita et al. | 348/340 |
| 7,441,895 B2 * | 10/2008 | Akiyama et al. | 351/206 |
| 7,701,492 B2 * | 4/2010 | Motomura et al. | 348/240.2 |
| 7,854,510 B2 * | 12/2010 | Verdooner et al. | 351/214 |
| 2009/0309984 A1 | 12/2009 | Bourgain et al. | |
| 2010/0033578 A1 | 2/2010 | Forestier et al. | |

FOREIGN PATENT DOCUMENTS

| | | |
|---|---|---|
| EP | 0610635 | 11/1993 |
| EP | 0610635 | 8/1994 |
| EP | 1156672 | 11/2001 |
| FR | 2623298 | 5/1989 |
| FR | 2698700 | 6/1994 |
| WO | 2007144290 | 12/2007 |
| WO | 2008071580 | 6/2008 |

OTHER PUBLICATIONS

Google patent history search.*
IEEE history search for NPL.*
INSPEC history search for NPL.*
Akram, M.N. "Design of a Dual Field-of-View Optical System for Infrared Focal-Plane Arrays," Proceedings of the SPIE, vol. 4767, Jan. 1, 2002, pp. 13-23.

* cited by examiner

*Primary Examiner* — William C Vaughn, Jr.
*Assistant Examiner* — Luis M Perez
(74) *Attorney, Agent, or Firm* — Baker Hostetler LLP

(57) ABSTRACT

The invention relates to an imaging device which includes a matrix IR detector, a multifocal lens with a focal length ranging from a short focal length to a long focal length, including a front group of lenses, a variator, a compensator and means for positioning the variator and the compensator, the positions of the variator and of the compensator being respectively adapted to the focal length. This device includes a calibration system which comprises a control for the means for positioning the variator in the vicinity of its short focal length position and the compensator upstream of its long focal length position so as to conjugate the plane of the detector with a real object plane located upstream of the front group of lenses, this positioning being called calibration positioning.

15 Claims, 6 Drawing Sheets

FIG.4a
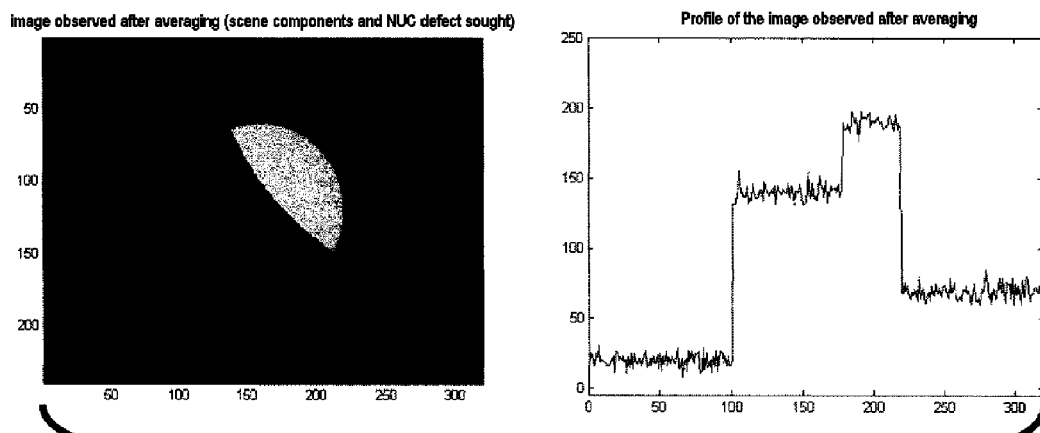
Non-linear filtering
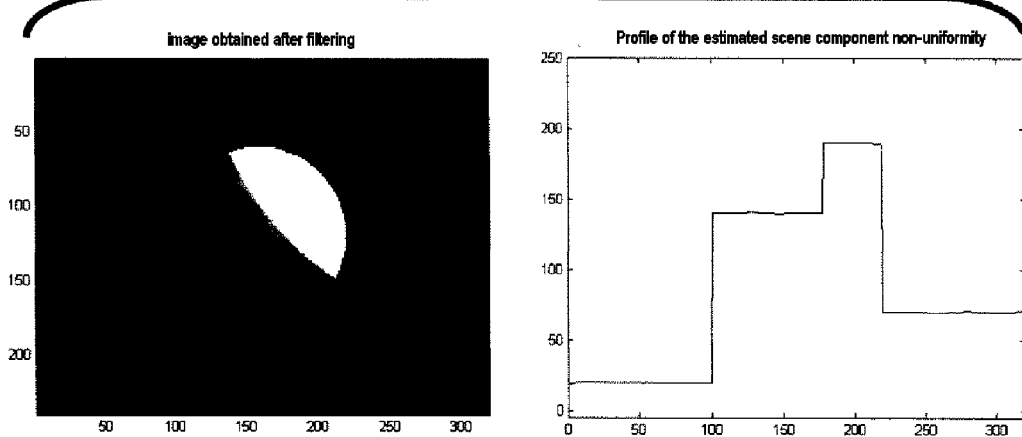
FIG.4b

MIXED OPTICAL DEVICE FOR MULTIFOCAL IMAGING AND IR CALIBRATION

CROSS-REFERENCE TO RELATED APPLICATIONS

This application is a National Stage of International patent application PCT/EP2009/052525, filed on Mar. 4, 2009, which claims priority to foreign French patent application No. FR 08 01184, filed on Mar. 4, 2008, the disclosures of which are incorporated by reference in their entirety.

FIELD OF THE INVENTION

The field of the invention is that of the calibration of IR multifocal imaging devices that use matrix detectors. The term "calibration" should be understood to mean the correction of non-uniformities in the image. The invention applies notably to the thermal imaging cameras intended for the detection, recognition and identification of distant objects.

BACKGROUND OF THE INVENTION

The matrix detectors that use multiple individual sensors deliver a video signal representative of the observed scene. This video signal is formed by the transfer and multiplexing of charges released by the sensors according to the lighting received by each sensor, using known electronic devices of the charged coupled or charge transfer type. The quantity of charges transferred is also a function of the charge integration time. In IR imaging, the detector and the charge transfer device are arranged in a cryostatic chamber cooled by systems operating according to known techniques.

As a general rule, an image comprises a scene (structured) on a uniform (and therefore unstructured) background and the video signal then includes a continuous component that is a function of the background luminescence and a variable component representing the scene. The continuous component generally has a relatively high value compared to the variable component representing the scene. For example, in the 3 to 5 µm or 8 to 12 µm bands, a temperature difference between the scene and the background equal to one degree Celsius is typically reflected in a variation by a few % of the video signal relative to the continuous component.

The imaging devices that use matrix detectors and more particularly the IR imaging devices are subject to the following constraints:
  on the one hand, the contrast of the objects is low: for a temperature range of 1° C., it is, as has just been shown, a few % whereas IR imaging involves temperature differences of the order of $1/10°$ C.;
  on the other hand, the various individual sensors of a matrix detector do not generally have the same response, and these responses are not perfectly stable in time: in practice, during the analysis of a uniform background, the scattered responses from the sensors reproduce the intrinsic variations of the sensors and constitute a signal that is unstable in time including noise overlaid on a continuous component equal to the average response;
  finally, the structural flux of the imaging device seen by each sensor, whether direct (through emissivity of the optical "duct") or whether seen by stray reflection on the diopters of the optical combination (Narcissus effect), varies with the fluctuations in space and time of the internal temperature of the camera. This stray flux is overlaid on the useful flux and thus falsifies the perception of the scene.

Consider a matrix detector which comprises sensors $(i, j)$ distributed on I rows and J columns, with $1 \leq i \leq I$, $1 \leq j \leq J$. It will be recalled that, as a first approximation, the output $Y_{ij}$ of each sensor $(i, j)$ of the IR matrix detector is linear according to the flux F received (sum of the scene flux and of the structural flux): $Y_{ij} = O_{ij} + G_{ij} \times F$. The term $O_{ij}$, commonly called "offset", represents the dark current of the individual sensor and $G_{ij}$ represents the gain of the sensor.

Generally, a precalibration is performed in the factory, by placing the equipment facing a uniformly black body and by varying the temperature thereof, this making it possible to calculate for each individual sensor, the gain and "offset" corrections with which to reconstitute a perfectly uniform image. These correction tables take account of the defects specific to the detector and the non-uniformities of the structural flux in the calibration conditions, and become irrelevant as soon as the temperature conditions in the equipment deviate too far from the calibration conditions. It will be understood that, in the final analysis, corrections must regularly be made to the "offsets" of the individual sensors during the operational use of the equipment.

One effective correction principle consists in periodically replacing the flux from the scene—essentially structured—with a reference flux that is spatially unstructured (ideally uniform) and representative of the average level in the scene; in these conditions, it is possible to measure the stray variations of the signal due to the detector and to the structural flux, and therefore to restore, after subtraction, a faithful image of the scene.

One conventional calibration technique consists in presenting to the detector the light flux from a black body whose temperature is adjusted to the average temperature of the observed scene using a servo control loop; the black body is placed in the optical path using a dedicated opto-mechanical switch, for example a tilting mirror. This temperature-locked black body system is complicated, in particular when its temperature is much colder than that of the camera: this poses numerous problems associated with condensation on the black body, the speed of response of the servo control loop, the control and differential measurement of the temperature, etc. Also, to guarantee a quality calibration, the black body must be raised to a precise temperature, and when the black body cannot be placed in the immediate vicinity of a pupil plane, it is essential to eliminate the thermal gradients along the emitting surface, the emissivity of which must be known and controlled.

Similarly, the use of a shutter blocking the optical path makes it possible to perform a calibration function with reduced performance levels but freed of the constraint of integration of a reference black body.

Another device is described in the patent FR 92 14307, which relates to single-focus (i.e. single-field) IR imaging optical systems: this time, by means of an additional device, a group of lenses dedicated to calibration is inserted or translated into the optical path, which makes it possible to reject the aperture area in the plane of the scene (i.e. to infinity), so as to totally defocus the scene flux while retaining the same field of view of the camera.

In all these cases, in order to calibrate an IR camera, an additional mechanism dedicated to the function is used, which increases the cost, the bulk and the weight of the equipment.

Other calibration techniques are proposed, but at the price of very detrimental operational constraints. Thus, to switch to calibration mode, some manufacturers advise the user to target a very near scene, such as, for example, the ground vertically beneath the imaging device, the camera being focused to infinity; some even recommend the use of an opaque cover blocking the head optic, assumed adjacent to the aperture area, in order to present to each pixel an defocused flux but one whose temperature is not necessarily close to the average scene temperature.

In these last two cases, it will be noted that, during calibration, the user de facto loses his imaging line of sight, which is unsatisfactory from an operational point of view.

The aim of the invention is to obtain a calibrated multifocal IR imaging device that does not include any excess cost or detrimental operational constraints by virtue of the calibration.

SUMMARY OF THE INVENTION

According to the invention, the calibration, also designated "NUC", an acronym for "non-uniformity correction", is obtained by carefully positioning along the optical axis the two mobile groups needed for the multifocal imaging function, in other words the variator and the compensator, so as to strongly defocus the observed scene which is assumed to be distant. The image of the non-uniformities obtained with this NUC configuration, called NUC image, is then subtracted from the images obtained in imaging configuration so as to restore corrected images.

More specifically, the subject of the invention is an imaging device which has an optical axis and which comprises:
   a matrix IR detector,
   a multifocal lens (or zoom) with a focal length ranging (i.e. being variable) from a long focal length to a short focal length, including a front group of lenses, a variator, a compensator, and means of positioning the variator and the compensator, the positions of the variator and of the compensator being respectively dependent on the focal length.

It is mainly characterized in that the positioning means include means of translating the variator and the compensator on the optical axis, in that it includes a calibration system which comprises a control for the means for positioning the variator in the vicinity of its short focal length position and the compensator upstream of its long focal length position so as to conjugate the plane of the detector with a real object plane located upstream of the front group of lenses, typically a few centimeters from the latter, this positioning being called calibration positioning, and in that it includes, linked to the matrix detector, a processing unit which includes means for accumulating images obtained in calibration positioning mode.

In these conditions, in NUC configuration, any distant object appears very strongly defocused on the detector, and none of the diopters of the combination is conjugated with the detector, which has the advantage of rendering the NUC configuration insensitive to the presence of local defects on the diopters.

In the final analysis, by shrewdly using the two mobile groups necessary for the multifocal imaging function, the camera is provided with an effective means of correcting image non-uniformities with no extra cost because there is no specific system, and without losing the imaging line of sight.

In the proposed NUC configuration, the scene located at a great distant is not, in principle, placed in a pupil plane. Physically, the image of a small source has the shape of a very large disk on the focal plane, but it does not necessarily totally cover the latter.

As long as the temperature difference between the source and the background does not typically exceed 50° C., then the lighting level of the disk relative to the background is less than the camera's NETD (noise equivalent temperature difference, which represents the camera's measurement thermal resolution); the reasoning obviously applies to a more complex scene: if the latter does not include sources that are too hot, then the modulation in the image of the scene in NUC configuration remains below the camera's NETD, and consequently everything happens as if the camera were observing a uniform black body servo controlled to the temperature of the scene background. The NUC image obtained in these conditions is not totally representative of the specific defects of the detector that are to be corrected since it includes, in addition to the latter, a spatial low-frequency component imparted by the structural flux (in particular the flux imparted by the Narcissus effect). Consequently, it is advantageous to complement the device with a high-pass type processing of the NUC image, capable of eliminating the spatial low-frequency non-uniformities; the "offset" corrections deduced from this filtered NUC image are then relevant for all the imaging configurations.

If the scene now includes small intense sources, then the image in NUC configuration consists of a certain number of disks (as many as there are intense sources), the levels of which are greater than the NETD. It is therefore advantageous to complement the device with an image processing capable of eliminating the spatial non-uniformities from the image. In this case in which the non-uniformities consist of a set of disks of high levels, a simple filtering of the low frequencies is no longer sufficient and it is necessary to carry out a nonlinear filtering in order to preserve the significant discontinuities and smooth the low-amplitude defects. The result of this filtering is an estimation of the defocused scene component that is to be subtracted from the aggregate image in order to obtain an estimate of the defects.

According to a characteristic of the invention, the device comprises a filter (for example a nonlinear filter) capable of filtering the aggregate image obtained in calibration positioning mode, means for calculating a correction map, and means for correcting images obtained in imaging mode.

The focal lengths typically vary from 25 to 135 mm, possibly discretely.

The type of nonlinear filter discussed previously can, for example, be implemented as part of a Markov field modeling or as part of the variational techniques that lead to iterative resolution schemes equivalent to anisotropic diffusion equations known to those skilled in the art.

The IR band is, for example, between 3 and 5 μm.

BRIEF DESCRIPTION OF THE DRAWINGS

Other features and advantages of the invention will become apparent from reading the following detailed description, given as a nonlimiting example and with reference to the appended drawings in which:

FIG. 4 diagrammatically represent an example of an image in NUC configuration consisting of two disks (a first small one and a portion of a large one), the level of which is greater than the NETD, observed after averaging and the profile of this image (FIG. 4a), and the result of the filtering on this image and on its profile (FIG. 4b). These FIG. 4b are estimations of the defocused scene component.

From one figure to another, the same elements are identified by the same references.

DETAILED DESCRIPTION

Figure 1A:
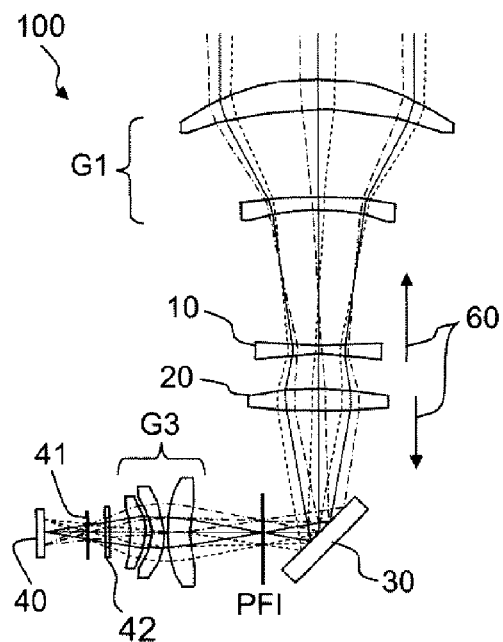
FIG. 1 diagrammatically represent the main optical elements of an imaging device according to the invention with long focal length imaging configuration (FIG. 1a), short focal length imaging configuration (FIG. 1b) and NUC configuration (FIG. 1c).
Figure 1B:
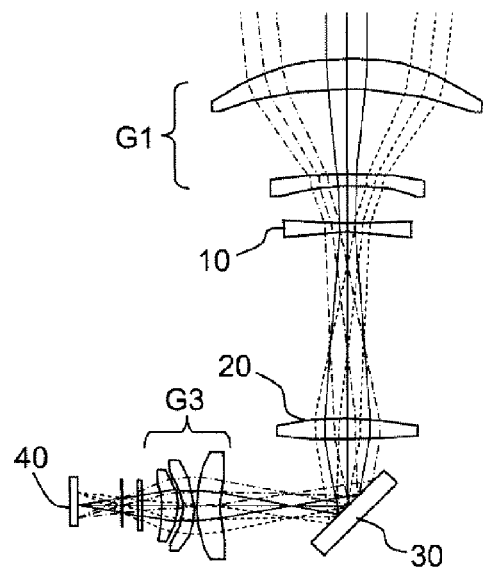
Figure 1C:
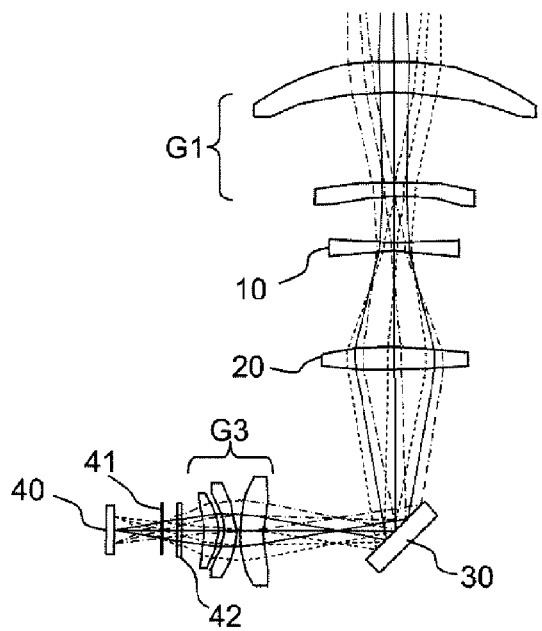

An example of a multifocal IR passive imaging device 100 according to the invention, described in relation to FIGS. 1a to 1c, typically comprises, on one and the same optical axis (represented in FIG. 7 by the reference 5):

detection means comprising a two-dimensional IR matrix detector 40 placed in a cryostatic chamber in order to be cooled; this detector comprises, for example, 384×288 individual sensors at a pitch of 15 µm, placed in the focal plane. Sensitive, for example, in the 3-5 µm band, it may consist of a mercury, cadmium and tellurium (HgCdTe) material. Other materials can be used, such as multiple quantum-well materials in gallium arsenide/gallium and aluminum arsenide (AsGa/AsGaAl) compounds; the indium antimonide (InSB) compound can also be used, an aperture diaphragm 41 embodied by the cold diaphragm of the cryostatic chamber located approximately 10 mm from the detector 40, also designated imaging pupil, with an aperture characterized by a numerical aperture of approximately ⅙ or F/3, F being the focal length, a window 42 made of silicon approximately 1 mm thick located approximately 3.2 mm away from the cold diaphragm of the cryostatic chamber, of a deflecting mirror 30, an optical combination comprising the following dioptric groups:

a. a multifocal lens or zoom, the focal lengths of which range from 27 to 132 mm; they vary continually or assume discrete values. The corresponding fields range from 2.5° to 12° horizontally and therefore from 1.9° to 9° vertically given the dimensions of the detector; the means for varying the focal length comprise the lenses respectively designated variator 10 and compensator 20 and means 60 of translating these lenses on the optical axis in a variable position according to the selected mode. These translation means 60 are symbolized in FIG. 1a by the arrows. A stepper motor is used, for example, for this translation. Another example of translation means consists in combining a direct current motor equipped with a geared motor, and a position copying sensor of the linear resistive potentiometer type. The convergent head group G1 comprises, for example, the conventional sequence Si(+)/Ge(−), with Si standing for silicon, Ge for germanium, + for convergent, − for divergent. The variator 10, divergent (for example made of Ge), is primarily used to obtain a variation of the focal length of the optical system. The compensator 20, convergent (for example Si(+)/Ge(−)/(Si(+) in spherical lenses or 1 single aspherical Si lens), is an element that is primarily used to keep the focusing plane virtually fixed. In short focal length or LF (large field) imaging configuration (FIG. 1b), the variator 10 is in its upstream maximum position and the compensator 20 is in its downstream maximum position, and they thus make it possible to obtain a horizontal field of 12°. The upstream-downstream direction is assumed to correspond to the direction of propagation of the light arriving from outside to be focused on the detector. For the long focal length or SF (small field) imaging configuration (FIG. 1a), the variator 10 is in its downstream maximum position and the compensator 20 is in its upstream maximum position; to switch to NUC mode, the zoom is configured to conjugate the detector with an object plane located upstream of the head lens, a few centimeters from the latter; in these conditions, it is obvious that any distant object will appear strongly defocused; in this configuration, the variator is in a position similar to its LF position and the compensator is in a position located slightly upstream of its SF position, a few millimeters from the latter. This positioning is designated calibration positioning. The positions of the variator and of the compensator are obtained as follows: firstly, the variator is placed in the LF position and the compensator is placed in the SF position, which provides a first strongly defocused configuration; by successive iterations, the positions of the 2 elements are optimized so as to conjugate, with the greatest possible calibration magnification $g_{NUC}$, an object plane typically located a few centimeters upstream of G1 and the focal plane of the detector 40; this has the effect of maximizing the defocusing of an object located at infinity. This optimization is accompanied by a certain number of constraints aimed, for example, at not excessively increasing the travel of the systems against the imaging need alone; furthermore, it is possible to keep a certain distance between the object plane and the external diopter of the group G1, in order to render the NUC configuration fairly insensitive to the presence of the inevitable surface defects on this diopter. In the example given, the characteristics of the NUC configuration after optimization are as follows:

object plane located 6.8 cm upstream of G1 variator 1.7 mm downstream of its LF position compensator 7.2 mm upstream of its SF position This leads to a magnification $g_{NUC}$=0.277.

b. a relay group G3 imaging an intermediate focal plane PF1 on the focal plane of the detector 40, comprises, for example, one of the spherical sequences Si(+)/CaF2(−)/Si(+) or Si(+)/Ge(−)/Si(+), CaF2 designating fluorine; through a few sacrifices on image quality, the relay group can possibly be reduced to a single aspherical lens made of silicon.

Figure 7:
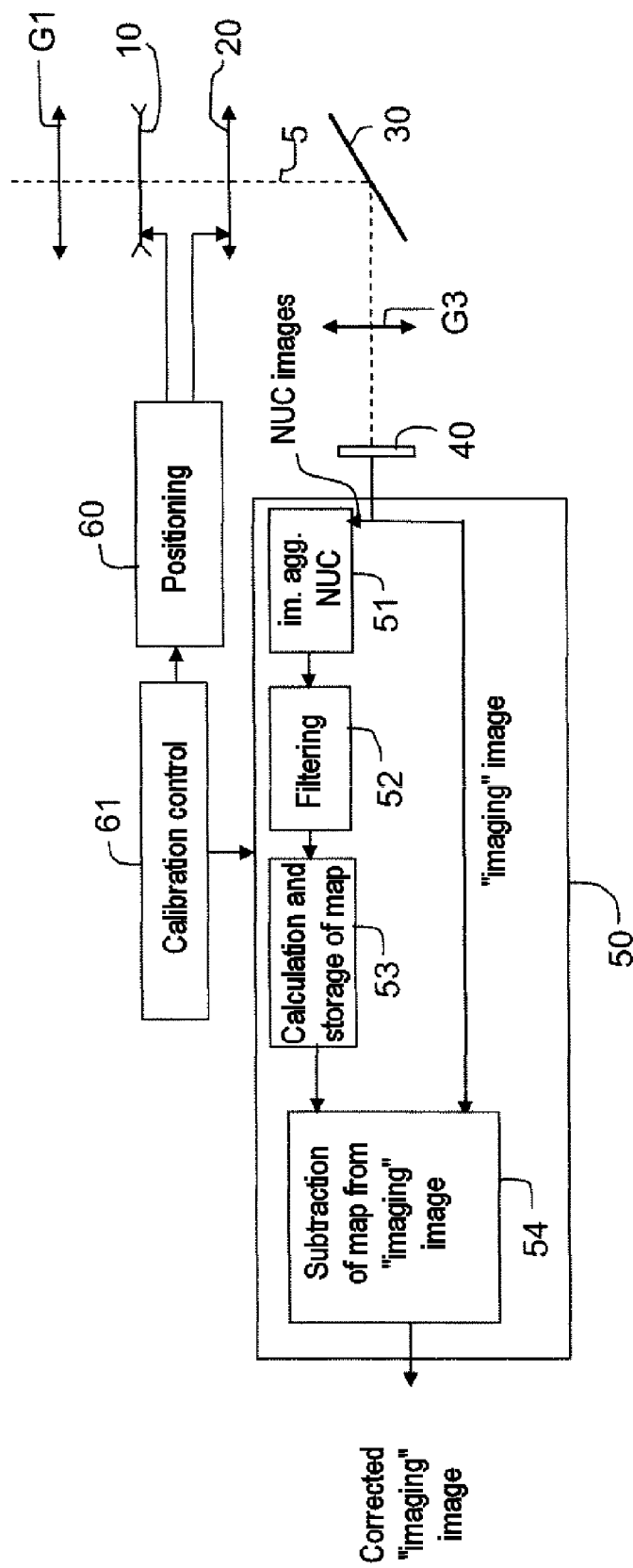
FIG. 7 diagrammatically represents an example of a multifocal IR passive imaging device according to the invention.

The imaging device also comprises an image processing unit 50 linked to the detector 40, shown in FIG. 7. The function of this unit is notably to apply to the images obtained in imaging configuration, the corrections of non-uniformities obtained in NUC configuration.

The elements of the calibration device used to implement this NUC configuration will now be detailed.

Figure 2A:
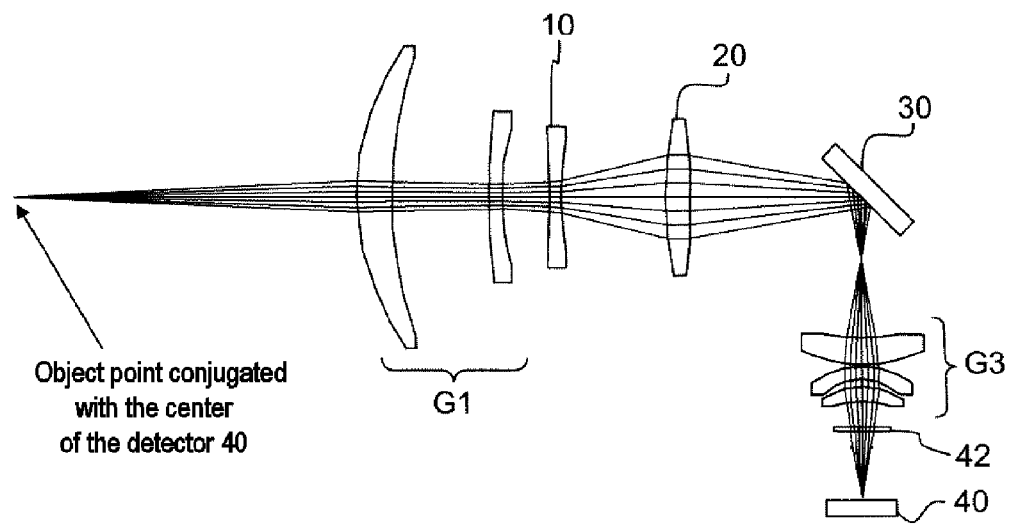
FIG. 2a shows the position of the focused object plane on the detector when the zoom is in NUC configuration, FIG. 2b diagrammatically represents the impulse response in the plane of the detector in NUC configuration for a distant singular object.
Figure 2B:
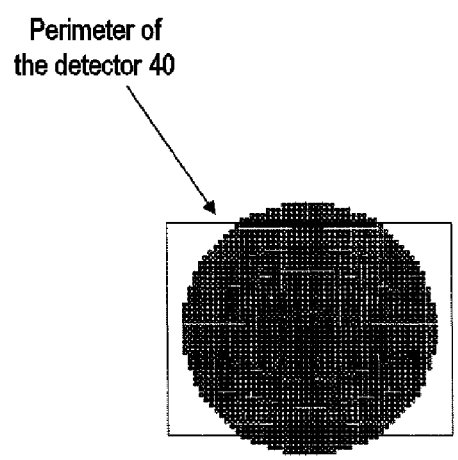

FIG. 2b shows that, in NUC configuration, the response of the zoom to an infinitely distant singular object covers practically all of the detector 40, the perimeter of which is indicated.

Figure 3A:
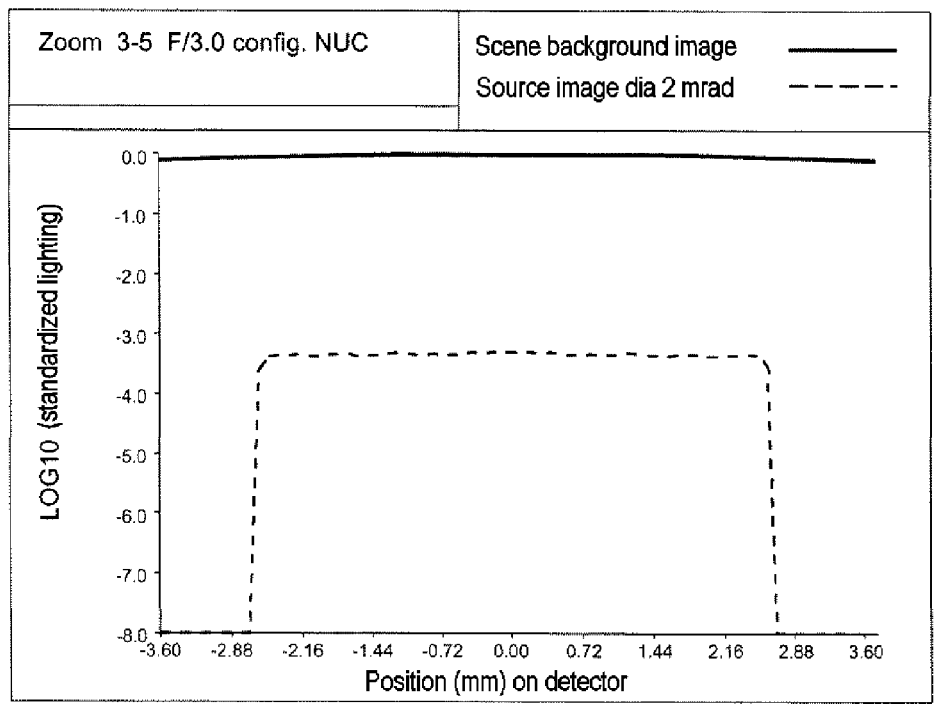
FIGS. 3a and 3b diagrammatically represent, in NUC configuration, the lighting of the detector ("focal plane array") for a simplified scene consisting of a small object (2 mrad diameter) placed on a uniform background. In these figures, the structural flux (in particular the flux imparted by Narcissus effect) has been deliberately omitted in order to highlight the specific performance characteristics of the defocusing.
Figure 3B:
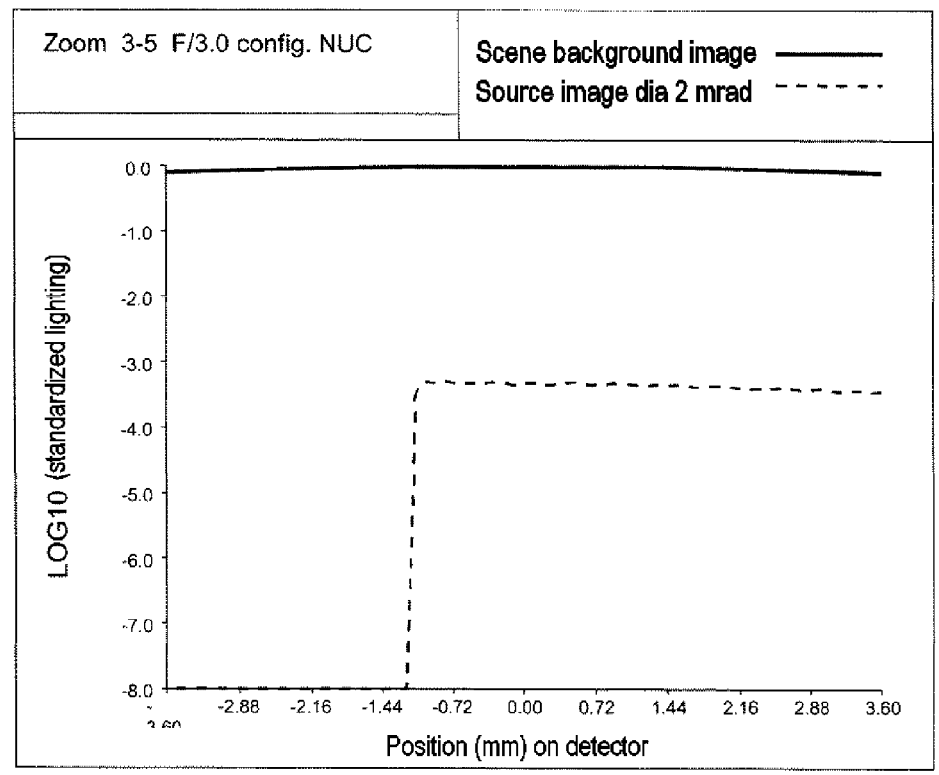

FIGS. 3a and 3b detail the components of the lighting of the focal plane when the zoom configured in NUC mode observes an object of angular diameter 2 mrad placed on a uniform background. The scene background component and the component imparted by the strongly defocused image of the source are given for 2 positions of said source in the field: in FIG. 3a, the source is located at the center of the field whereas in FIG. 3b, it is placed off axis. The lightings are standardized, that is to say, they are given a unity background (respectively source) luminescence and the scene background lighting at the center of the detector is assumed equal to 1. The x-axes indicated are those between the diagonal edges of the detector located in the focal plane.

In NUC configuration, as in imaging configuration, the scene background produces the same lighting which is expressed:

$$I_{background} = \text{Transm} \times PSA_{useful} \times L(T_{background}).$$

Transm is the transmission of the optic,
$PSA_{useful}$ ("projected solid angle") is the useful projected solid angle, which in our example is approximately 87 millisteradians (system opened to F/3.0); strictly speaking $PSA_{useful}$ may vary slightly from one point to another of the matrix ("$\cos^4\theta$" effect),
$L(T_{background})$ is the luminance of the scene background incorporated in the useful spectral band (for example 3.4-4.8 μm).

In NUC configuration, the image of the object does not produce a uniform lighting in the plane (x, y) of the detector. This is expressed:

$$I_{NUC}(x,y) = \text{Transm} \times PSA_{NUC}(x,y) \times L(T).$$

$PSA_{NUC}(x, y)$ is the projected solid angle at the point (x, y), delimited by the aperture diaphragm and the object: in practice, when the defocusing is very great, the source is not necessarily resolved by the detector.
$L(T)$ is the luminance of the object at temperature T, incorporated in the useful spectral band.

FIGS. 3a and 3b show, according to the position (x, y) relative to the center (0,0) of the detector:

the image of the scene background, or $$\text{Log } 10[PSA_{useful}(x,y)/PSA_{useful}(0,0)],$$

the image of the source, or $$\text{Log } 10[PSA_{NUC}(x,y)/PSA_{useful}(0,0)].$$

The spatial variations of $PSA_{NUC}$ thus produce an apparent temperature difference relative to the background which is expressed:

$$\Delta T = L(T) \times [PSA_{NUCmax}/PSA_{useful}] \times [1 - PSA_{NUCmin}/PSA_{NUCmax}]/[dL/dT](T_{background}).$$

In our example, $PSA_{NUCmin} = 0$, and as a first approximation, is it possible to show that $PSA_{NUXmax} = \pi (\delta\theta)^2/g_{NUC}^2$, in which $\delta\theta$ represents the half-angular diameter of the object (in this case, 1 mrad); it will thus be understood that $g_{NUC}$ must be maximized in order to reduce $PSA_{NUCmax}$, and consequently $\Delta T$.

To fix the concepts, in FIGS. 3a and 3b, it is found that:

$$[PSA_{NUCmax}/PSA_{useful}] \times [1 - PSA_{NUCmin}/PSA_{NUCmax}] = 0.0005$$

For an object of 50° C. on a background at 20° C., we have:

$$L(T)/[dL/dT](T_{background}) = 73° \text{ K, and consequently}$$
$$\Delta T = 37 \text{ m}° \text{ K.}$$

For an object at 100° C. on a background at 20° C., we have:

$$L(T)/[dL/dT](T_{background}) = 298° \text{ K, and consequently}$$
$$\Delta T = 149 \text{ m}° \text{ K.}$$

By accepting that NETD is around 100 m° K, if the scene includes only objects whose thermal contrast relative to the background does not exceed approximately 50° C., then the latter appears in NUC configuration to be uniform.

In the proposed NUC configuration, the scene located at a great distance is not, in principle, placed in a pupil plane. Physically, the image of a small source has the form of a very large disk on the focal plane, but does not necessarily completely cover the latter; the lighting level of the disk relative to the background is less than the NETD (noise equivalent temperature difference, which represents the camera's measurement thermal resolution) of the camera as long as the temperature difference between the source and the background does not typically exceed 50° C. The reasoning obviously applies to a more complex scene: if the latter does not include very hot sources, then the modulation in the image of the scene in NUC configuration remains less than the NETD of the camera, and consequently everything takes place as if the camera were observing a uniform black body servo controlled to the temperature of the scene background. In imaging mode, the corrected image is then obtained by subtracting the NUC image (defocused); this is done by the image processing unit 50, the operation of which will be detailed below.

Preferably, a filtering is applied to the NUC image in order to extract the spatial noise component linked to the detector.

In practice, the NUC image comprises—in addition to the specific defects of the detector—a spatial low-frequency component imparted by the structural flux (in particular the flux imparted by the Narcissus effect). It is consequently advantageous to complement the device with a high-pass type NUC image processing that is capable of eliminating the spatial low-frequency non-uniformities; the "offset" corrections deducted from this filtered NUC image are then relevant for all the imaging configurations. It will be recalled that, generally, the Narcissus effect is weak in the SF configurations, and that, furthermore, those skilled in the art will limit as far as possible the Narcissus differential between the different zoom configurations.

If the scene now includes small intense sources, then the image in NUC configuration consists of a certain number of disks (as many as there are intense sources), the levels of which are greater than the NETD; an example of such an image observed after averaging and the profile of this image are shown in FIG. 4a. It is therefore advantageous to complement the device with an image processing capable of eliminating the spatial non-uniformities from the image.

The x-axis of the coordinate system associated with the images is the same as that of the coordinate system associated with the profiles. The profile represents, on the y-axis, the lightings of each of the pixels located on the center line of the image.

In the case explained below in which the non-uniformities consist of a set of high-level disks, a simple filtering of the low frequencies is no longer sufficient and it is essential to perform a nonlinear filtering which makes it possible to preserve the significant discontinuities and smooth the low-amplitude defects. In the present case, the strong discontinuities that are to be preserved in the filtering are linked to the presence of objects that are strongly contrasted (typically such that $\Delta T>50°$ C.) in the scene. The result of this filtering is an estimation of the defocused scene component that is to be subtracted from the aggregate image in order to obtain an estimate of the defects.

The type of nonlinear filter discussed previously can, for example, be implemented as part of a Markov field modeling or by variational techniques which lead to iterative resolution schemes equivalent to anisotropic diffusion equations known to those skilled in the art. The result obtained by this type of nonlinear filtering is illustrated in FIG. 4b.

This filtering comprises, for example, the following steps:

Digital aggregation/averaging of defocused images: the aim of this operation is to reduce or even eliminate the influence of the temporal noise. This operation can be carried out:

either directly according to the following algorithm:

```
I agg = 0
for I ranging from 1 to N
    I agg = I agg + I current(I)
end for
Iaverage = Iagg/N
``` or recursively according to the following algorithm ($\alpha<1$):

```
I agg = I current(I)
as long as the averaging is active
    Iaverage = α*Iaverage + (1-a)*Icurrent (I)
end while
```

This operation is generally carried out using a programmable logic array of the FPGA (field-programmable gate array) type, in order to reduce the latency time, but it can also be carried out via a microprocessor. Particular attention must be paid to the coding dynamics of the Iaverage and Iagg images so as not to lose the improved dynamics obtained (e.g. coding on 6 bits more than the current image for an aggregation of $64=2^6$ images). An aggregation of ten or so to a hundred or so images is possible depending on the time allotted for the calibration and, for example, for an aggregation of 64 images with an acquisition at 100 Hz, a delay of 640 ms is necessary in order to calculate Iaverage.

Determination on the aggregate image of the component due to the defocused scene; this component is made up of a set of disks of variable radii: the aim of this operation is to determine the non-uniformities on the aggregate image originating from any hot objects that might have been located in the field at the time of the acquisition of the calibration images. Estimating these non-uniformities involves a nonlinear filtering that makes it possible to preserve the discontinuities using a Markov field modeling or variational techniques. An iterative filter is then preferably used that models a nonlinear diffusion equation called "Malik and Perona diffusion" that makes it possible to preserve the discontinuities. Such an example of filtering is illustrated in FIG. 4. FIG. 4a diagrammatically represent an image observed after averaging and the profile of this image; the results of the filtering on this image and on its profile are represented in FIG. 4b. An estimate of the defects is obtained by subtracting an estimate of the defocused scene component from the aggregate image.

Figure 5A:
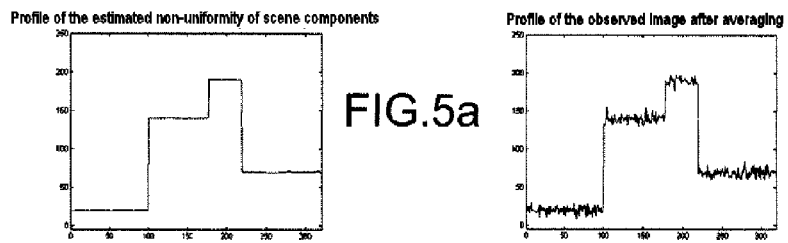
FIG. 5a are copies of the profiles of FIGS. 4a and 4b FIG. 6 diagrammatically represent the result of the real defect map (FIG. 6a) compared to the estimated map (FIG. 6b). The difference between these 2 maps shows the residual defect due to the profile estimation error (FIG. 6c) and the corresponding image (FIG. 6d).
Figure 5B:
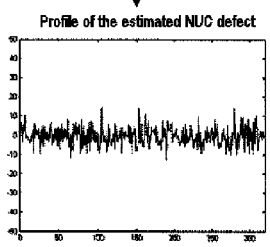
FIG. 5 diagrammatically represent an offset correction map, that is to say a profile of the estimate of the defects (FIG. 5b), determined by subtracting the scene non-uniformity profile estimated previously from the profile of the image obtained after averaging (FIG. 5a)

Determination of the detector's "offset" correction map: this offset correction map (FIG. 5b) is determined by subtracting the scene component estimated previously (FIG. 4b) from the aggregate image (FIG. 4a).

Figures 6A, 6B:
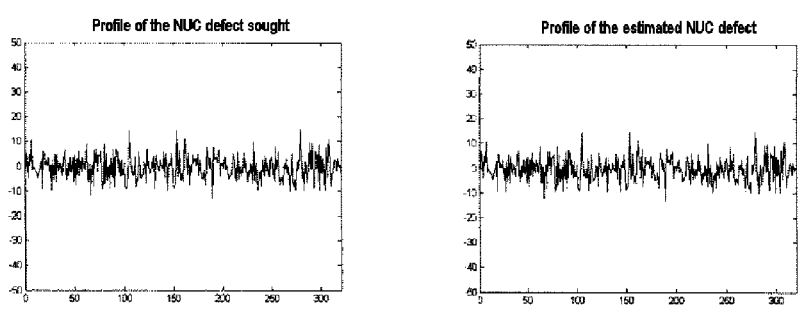
Figure 6C:
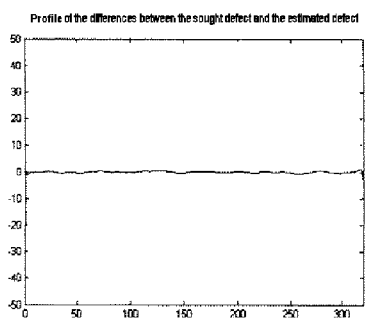
Figure 6D:
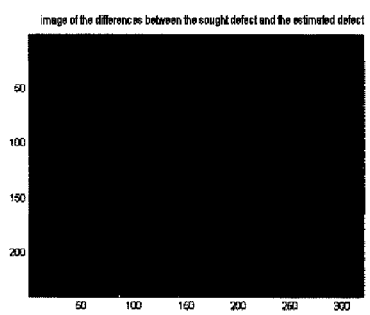

FIG. 6 illustrate the comparison between the real defect map (FIG. 6a) and the estimated map (FIG. 6b). The difference between these 2 maps (FIGS. 6c, 6d) shows the residual defect due to the estimation error, as a profile in FIG. 6c and as an image in FIG. 6d: it is virtually zero.

FIG. 7 shows an example of an imaging device according to the invention. It comprises the elements described in relation to FIG. 1, and the calibration device 61 linked to the positioning (in this case translation) means 60, and to the processing unit 50.

This processing unit 50 comprises:

means 51 of aggregating images obtained in NUC configuration, such as, for example, an FPGA as indicated previously, a filter 52 capable of applying a nonlinear filtering to these NUC images, as described previously, means 53 of calculating the detector's "offset" correction map, as described previously and of storing this correction map, and means 54 of subtracting this stored correction map from the images obtained in imaging configuration, so as to obtain corrected images.

When the user wants to activate the calibration mode, he actuates the calibration system 61, which on the one hand controls the means 60 of positioning the variator 10 and the compensator 20 in calibration (or NUC) positioning and on the other hand controls the processing unit 50 in order for the NUC images obtained from the detector 40 to be subjected to the processing used to obtain the correction map.

When the user wants to activate the imaging mode, he actuates the calibration system 61, which on the one hand controls the means 60 of positioning the variator 10 and the compensator 20 according to the desired focal length, and on the other hand controls the processing unit 50 in order for the images obtained from the detector 40 and obtained in "imaging" mode to be corrected by the means 54.

The invention claimed is:

1. An imaging device which has an optical axis and which comprises a matrix IR detector, a multifocal lens with a focal length ranging from a short focal length to a long focal length, including a front group of lenses, a variator, a compensator and means of positioning the variator and the compensator, the positions of the variator and of the compensator being respectively adapted to the focal length, wherein the positioning means includes means of translating the variator and the compensator on the optical axis, wherein the imaging device comprises a calibration system which comprises a control for the means for positioning the variator in the vicinity of its short focal length position and the compensator upstream of its long focal length position so as to conjugate the plane of the detector with a real object plane located upstream of the front group of lenses a few centimeters from the latter, this positioning being called calibration positioning, and comprising, linked to the matrix detector, a processing unit which includes means for accumulating images obtained in calibration positioning mode.

2. The imaging device as claimed in claim 1, wherein the processing unit includes, linked to the accumulation means, a filter capable of filtering the aggregate image obtained in calibration positioning mode.

3. The imaging device as claimed in claim 2, wherein the filter is a non-linear filter.

4. The imaging device as claimed in claim 1, wherein the processing unit includes means for calculating a correction map.

5. The imaging device as claimed in claim 1, wherein the processing unit includes means for correcting images obtained in imaging mode.

6. The imaging device as claimed in claim 1, wherein the focal lengths vary from 25 to 135 mm.

7. The imaging device as claimed in claim 1, further comprising at least one focal length in addition to the short and long focal lengths, these focal lengths being discrete.

8. The imaging device as claimed in claim 1, wherein the IR band is between 3 and 5 µm.

9. The imaging device as claimed in claim 2, wherein the IR band is between 3 and 5 µm.

10. The imaging device as claimed in claim 3, wherein the IR band is between 3 and 5 µm.

11. The imaging device as claimed in claim 4, wherein the IR band is between 3 and 5 µm.

12. The imaging device as claimed in claim 5, wherein the IR band is between 3 and 5 µm.

13. The imaging device as claimed in claim 6, wherein the IR band is between 3 and 5 µm.

14. The imaging device as claimed in claim 7, wherein the IR band is between 3 and 5 µm.

15. The imaging device as claimed in claim 8, wherein the IR band is between 3 and 5 µm.

* * * * *